United States Patent
Agrawal et al.

(10) Patent No.: US 6,592,627 B1
(45) Date of Patent: Jul. 15, 2003

(54) SYSTEM AND METHOD FOR ORGANIZING REPOSITORIES OF SEMI-STRUCTURED DOCUMENTS SUCH AS EMAIL

(75) Inventors: Rakesh Agrawal, San Jose, CA (US); Roberto Javier Bayardo, San Jose, CA (US); Dimitrios Gunopulos, Riverside, CA (US); Ching-Tien Howard Ho, San Jose, CA (US); Sunita Sarawagi, Maharashtra (IN); John Christopher Shafer, San Jose, CA (US); Ramakrishnan Srikant, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/329,684

(22) Filed: Jun. 10, 1999

(51) Int. Cl.[7] ........................... G06F 17/30; G06F 17/00
(52) U.S. Cl. ............................. 715/513; 715/5; 715/10
(58) Field of Search ............................. 707/513, 5, 10

(56) References Cited

U.S. PATENT DOCUMENTS

| | | | | |
|---|---|---|---|---|
| 5,765,170 A | * | 6/1998 | Morikawa | 707/1 |
| 6,137,911 A | * | 10/2000 | Zhilyaev | 345/440 |
| 6,161,130 A | * | 12/2000 | Horvitz et al. | 707/5 |
| 6,216,122 B1 | * | 4/2001 | Elson | 345/744 |
| 6,226,630 B1 | * | 5/2001 | Billmers | 345/968 |
| 6,243,724 B1 | * | 6/2001 | Mander et al. | 345/810 |
| 6,249,805 B1 | * | 6/2001 | Fleming, III | 707/10 |
| 6,282,565 B1 | * | 8/2001 | Shaw et al. | 709/200 |
| 6,314,421 B1 | * | 11/2001 | Sharnoff et al. | 707/100 |
| 6,324,587 B1 | * | 11/2001 | Trenbeath et al. | 709/206 |
| 6,370,526 B1 | * | 4/2002 | Agrawal et al. | 707/5 |
| 6,389,436 B1 | * | 5/2002 | Chakrabarti et al. | 707/3 |
| 6,442,546 B1 | * | 8/2002 | Biliris et al. | 707/10 |

OTHER PUBLICATIONS

Takkinen et al., "CAFE: A Conceptual Model for Managing Information in Electric Mail", Jan. 6–9 1998, Proc. 31st Annual Hawaii International Conference on System Sciences, vol. 5, pp. 44–5.*

Publication; "Scaling Up the Accuracy of Naive–Bayes Classifiers: a Decision–Tree Hybrid". Ron Kohavi. Aug. 1996.

Publication: "Learning Rules That Classify E–Mail". Wm. W. Cohen. 1996.

Publication: "Sonia: A Service for Organizing Networked Information Autonomously". Sahami et al. Jun. 1998.

(List continued on next page.)

Primary Examiner—Jospeh H. Feild
Assistant Examiner—Almari Romero
(74) Attorney, Agent, or Firm—John L. Rogitz (57) ABSTRACT

A user can easily organize computerized document folders by associating a few sample documents in the document database with each folder. The present invention learns folder profiles based on the sample documents and moves the remaining documents into the folders accordingly. In this way, the user can construct new folders, or rearrange existing folders, or cause the computer to automatically rearrange and maintain the folders. This is particularly useful for managing a database of perhaps thousands of emails.

29 Claims, 5 Drawing Sheets

OTHER PUBLICATIONS

Publication: "Agents that Reduce Work and Information Overloas". Pattie Maes. Communications of the ACM. vol. 37, No. 7, pp. 31–40. Jul. 1994.

Book: "Clustering Analysis". Edie Rasmussen. Chapter 16. pp. 419–422. 1988.

Publication: "Threading Electronic Mail: A Preliminary Study". Lewis et al. pp. 1–15. Information Processing and Management. 1997.

Publication: "Experience with a Learning Personal Assistant". Mitchell et al. Communications of the ACM. vol. 37, No. 7, pp. 81–91. Jul. 1994.

Publication: "Implementing Agglomerative Hierarchic Clustering Algorithms for Use in Document Retrieval". Ellen M. Voorhees. Information Processing & Management. vol. 22, No. 6, pp. 465–476. 1986.

Publication: "Context–Sensitive Learning Methods for Text Categorization". Cohen et al. Apr. 1999.

Publication: "Scatter/Gather: A Cluster–based Approach to Browsing Large Document Collections". Cutting et al. pp. 1–12. ACM, 1992.

* cited by examiner

FIG. 3
REORGANIZE BY SAMPLE

FIG. 4
CLASSIFY DOCUMENTS

FIG. 5
ADDING EXAMPLES

FIG. 6
CREATING A VIRTUAL FOLDER

FIG. 7
DISCOVERING FOLDER PROFILE

FIG. 8
ROUTE INCOMING MAIL/OUTGOING MAIL

FIG. 9
MAINTENANCE

SYSTEM AND METHOD FOR ORGANIZING REPOSITORIES OF SEMI-STRUCTURED DOCUMENTS SUCH AS EMAIL

BACKGROUND OF THE INVENTION

1. Field of the Invention

The present invention relates generally to repositories of data, and more particularly to organizing repositories of semi-structured documents such as email.

2. Description of the Related Art

Computer users increasingly generate repositories of semi-structured documents such as emails and Web pages. Such documents are stored in folders, and the folders can be arranged in a tree-like hierarchy. The documents, however, are not considered part of the hierarchy. A document can be present in more than one folder.

In the case of emails, many users simply receive these documents into a single inbox, and the inbox can become quite full. It will readily be appreciated that with hundreds and perhaps thousands of emails that many users now receive, it is important to organize the email repository, e.g., by subject matter or other convention, so that a user can efficiently manage the documents.

With this in mind, some email systems such as Lotus Notes7 permit a user to create a repository folder structure. Specifically, a user can define a folder hierarchy, name the folders, and then move documents into and out of folders as desired to keep the repository effectively arranged. Unfortunately, this requires that the user initially to manually move each document as appropriate into the various folders and sub-folders, and then continue to move new documents as they arrive from, e.g., the mail server, into the appropriate folders. Accordingly, while the resulting structure is an effective document management tool, in that the documents are arranged as desired by the user, considerable time and effort must be spent by the user to arrive at the desired organization and to then maintain it.

Accordingly, the present invention recognizes a need to provide automation in defining and populating an organizational structure of document folders. Furthermore, the present invention recognizes a need for allowing a person to interactively define and populate, with ease and efficiency, an organizational structure of document folders.

SUMMARY OF THE INVENTION

The invention is a general purpose computer programmed according to the inventive steps herein to organize document folders in response to classification indicia provided by a user. The invention can also be embodied as an article of manufacture—a machine component—that is used by a digital processing apparatus and which tangibly embodies a program of instructions that are executable by the digital processing apparatus to execute the logic disclosed below. This invention is realized in a critical machine component that causes a digital processing apparatus to perform the inventive method steps herein.

In accordance with the present invention, a computer includes at least one computer input device and means for receiving, from the input device, at least one signal representative of user-selected document classification indicia. Also, the computer includes means for determining a profile of at least one folder based on the user-selected document classification indicia.

In a preferred embodiment, the user-selected document classification indicia includes at least one sample document representing a user-desired example of documents in a user-selected folder. Also, the document classification indicia can include classification rules.

As disclosed in detail below, the computer preferably includes means for receiving one or more folder establishing signals from the input device. As intended by the present invention, the document classification indicia represent a user-desired profile of at least some folders. Means are provided for automatically moving one or more documents into the folders, based on the means for determining a profile.

The preferred means for determining a profile includes means for determining, for each document, respective folder probabilities. Each folder probability represents the probability of the document fitting the profile of the respective folder. Also, means define a destination of a document to be the folder associated with the highest folder probability, and means further define a confidence of a document properly being in a destination to be the ratio of the highest folder probability for the document to a second-highest folder probability for the document.

If desired, the process of learning a user's desired folder profile can be iterative. Accordingly, means automatically move one or more test documents into the folders, based on the means for determining a profile, with means then presenting the test documents, along with the associated folders, on a computer output device that is associated with the computer, such that a user can observe the test documents with folders and determine the efficacy of the profile determination. The user can add more sample documents or move test documents between folders to refine the profiles. Desirably, the additional user-defined document classification indicia can be requested to help refine the profile learning step. Additional applications of the invention include generating a folder, based on the user-defined document classification indicia, and grouping documents into sub-folders, based on the user-defined document classification indicia. The documents can be email documents, and the computer can route incoming email documents into one or more folders, based on the user-defined document classification indicia.

The present invention can also automatically organize folders if requested to do so by the user by discovering topics in the documents.

In another aspect, a computer-implemented method is disclosed for organizing semi-structured documents such as email documents in a database into one or more folders. The method includes receiving one or more sample documents from the user. The sample documents are a relatively small subset of the documents in the database. Also, the method includes automatically associating substantially all of the documents in the database with one or more folders, based on the sample documents.

In still another aspect, a computer program device includes a computer program storage device that is readable by a digital processing apparatus, and a program means is on the program storage device. The program means includes instructions that can be executed by the digital processing apparatus to perform method steps for organizing semi-structured documents into folders. The method steps include receiving, from a computer input device, at least one user-generated sample signal representing one or more sample documents, and based thereon, establishing a profile for one or more document folders. Based on the profile, documents are moved from a database into the folders.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
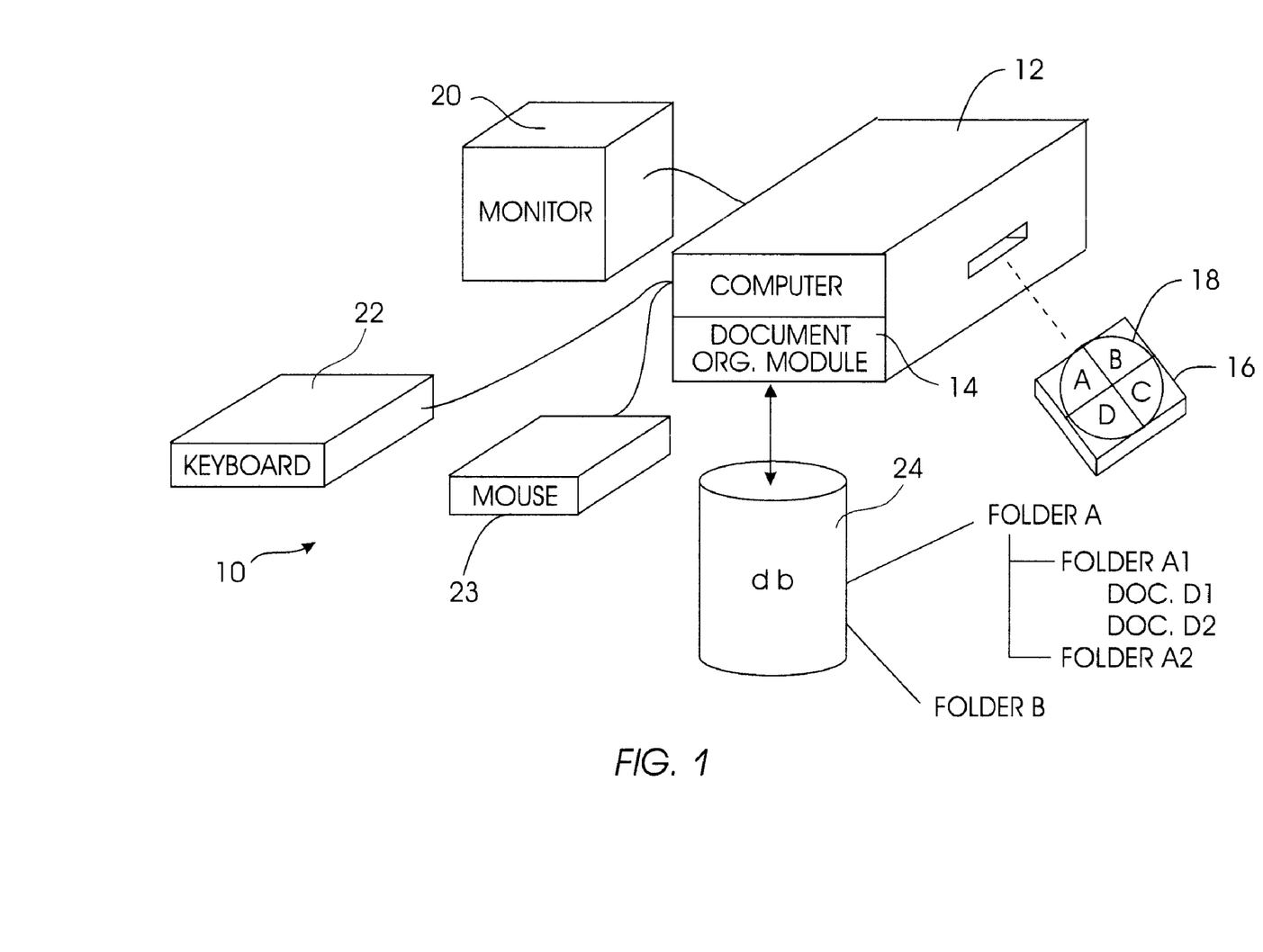
FIG. 1 is a block diagram of the present system.

Referring initially to FIG. 1, a system for creating, organizing, and maintaining electronically-stored folders that contain semi-structured electronic documents such as email documents and Web pages is shown, generally designated 10. In the particular hardware architecture shown, the system 10 includes a digital processing apparatus, such as a computer 12. In one intended embodiment, the computer 12 may be a personal computer made by International Business Machines Corporation (IBM) of Armonk, N.Y. as shown, or the computer 12 may be any computer, including computers sold under trademarks such as AS400, with accompanying IBM Network Stations. Or, the computer 12 may be a Unix computer, or OS/2 server, or Windows NT server, or IBM RS/6000 250 workstation, or an IBM laptop computer.

The computer 12 includes a document organization module 14 which may be executed by a processor within the computer 12 as a series of computer-executable instructions. These instructions may reside, for example, in RAM of the computer 12.

Alternatively, the instructions may be contained on a data storage device with a computer readable medium, such as a computer diskette 16 shown in FIG. 1 having a computer usable medium 18 with program code elements A–D thereon. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ compatible code. Thus, the logic of the present invention may be embodied by computer readable code means, but it is to be understood that the present logic can also be embodied by printed circuit boards and logic circuits on, e.g., application-specific integrated circuit (ASIC) chips, or otherwise be usable by a computer.

FIG. 1 also shows that the system 10 can include peripheral computer equipment known in the art, including an output device such as a video monitor 20 and an input device such as a computer keyboard 22. Other output devices can be used, such as printers, other computers, and so on. Likewise, input devices other than the keyboard 22 can be used, e.g., a mouse 23, or trackballs, keypads, touch screens, and voice recognition devices.

A computer database 24 for storing documents in folders in a hierarchy is accessible by the computer 12 and can be embodied in, e.g., a hard disk drive of the computer 12, or a magnetic tape drive, or optical disk drive, or other appropriate medium. As shown, the folders are stored in a tree-like hierarchy, with, for example, folders A and B stemming from a root of the tree and with, e.g., folder A containing subfolders A1 and A2. The folders contain documents. As an example, the folder A1 contain documents D1 and D2. The documents are contained in the folders but are not considered to be part of the folder tree.

Figure 2:
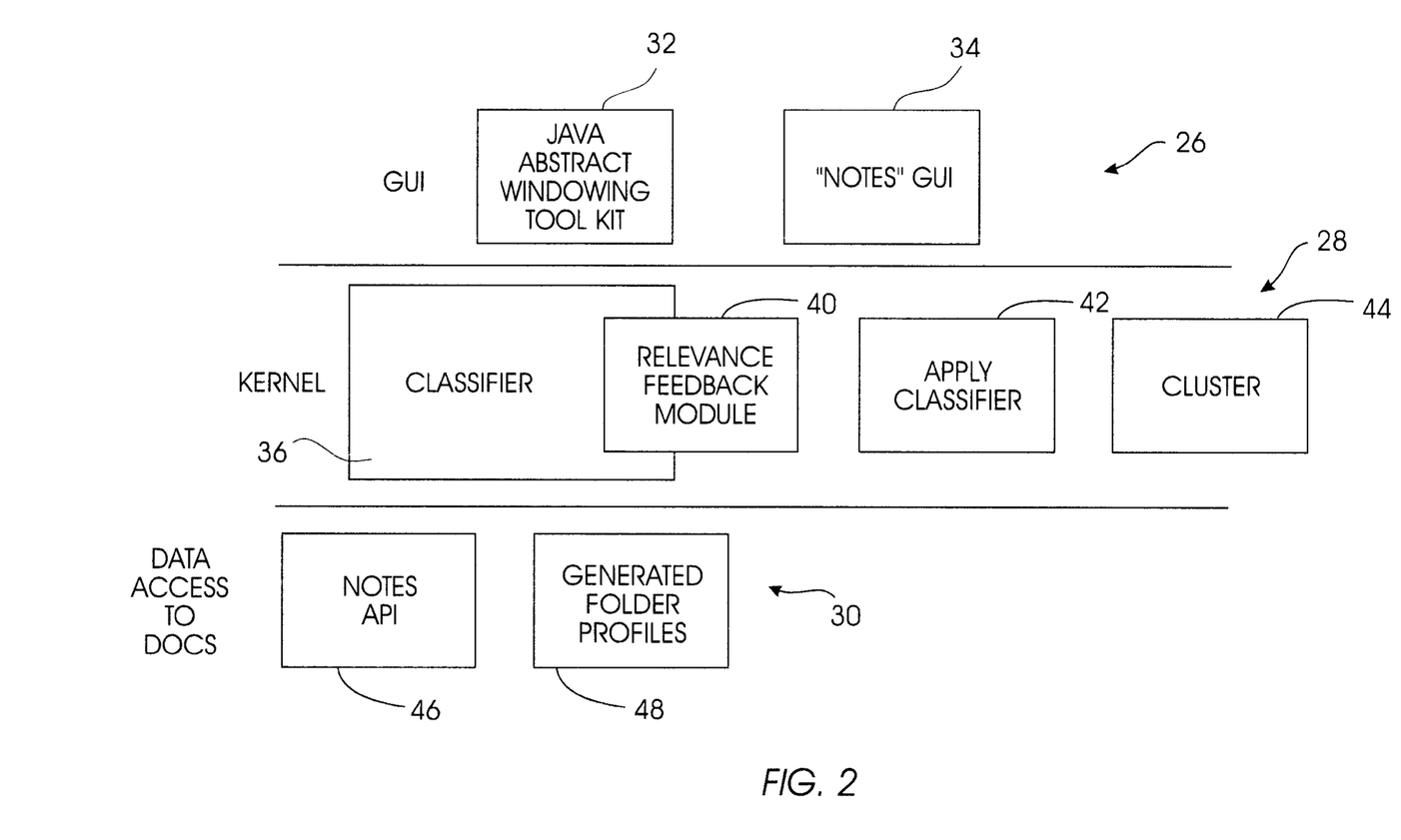
FIG. 2 is a block diagram of the software architecture of the present system.

Now referring to FIG. 2, one example of a software architecture is shown. In the example shown in FIG. 2, the software architecture is based on a Windows 95/NT operating system having Lotus Notes7 email application version 4.6.1. It is to be understood, however, that while the exemplary embodiment shown contemplates a particular email application, the principles herein apply equally to other email applications. Indeed, the principles herein apply to other document systems, e.g., the principles herein apply to the organization of folders for Web pages, letters, facsimiles, and other semi-structured documents.

As shown in FIG. 2, the exemplary software architecture includes a graphical user interface (GUI) level 26, a kernel level 28, and a data access level 30. The GUI level 26 includes a JAVA class such as an Abstract Windowing Toolkit (AWT) 32 cooperating with the native Notes7 GUI 34, to establish a user interface in accordance with the disclosure below. The kernel level 28 includes a classifier 36 that interacts with a relevance feedback module 40 in accordance with disclosure below to generate profiles of document folders based on classification indicia provided by the user. In the preferred embodiment, the classifier 36 is a Naive Bayes classifier augmented with relevance feedback from the relevance feedback module 40. The feedback module 40 is essentially established by the documents that the user moves between folders, and the classifier 36 accounts for this feedback by adjusting keyword frequencies appropriately. An apply classifier module 42 applies the classifications generated by the classifier 36 to the folders. Also, a cluster module 44 interacts with the relevance feedback module 40. At the data access level 30, a native Notes7 application program interface (API) 46 cooperates with a generated profile module 48 to provide access to the documents in the database 24 (FIG. 1).

Figure 3:
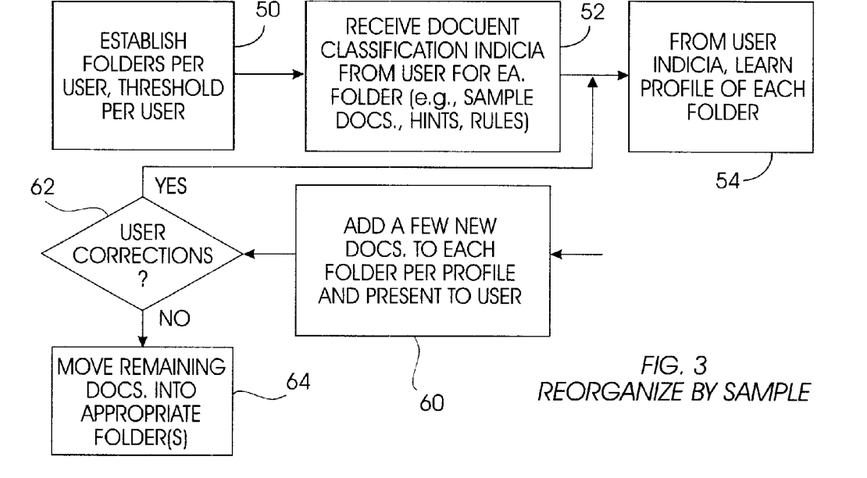
FIG. 3 is a flow chart of the logic for reorganizing document folders by user sample.

Now referring to FIG. 3, the logic is shown for reorganizing a document folder or folders that might have become large, unwieldy general repositories of documents. As shown at block 50, the user can establish a tree-like hierarchy of empty folders by conventional means. Also, the user can define a threshold "confidence" above which a document can be automatically moved, but below which the document will not be automatically moved.

Moving to block 52, the user inputs, for each folder, one or more classification indicia in the form of sample documents. In addition, the user can define classification rules such as "send all emails from John to folder #3".

Focussing on the case of sample documents, the organization module 14 (FIG. 1) learns preliminary profiles of each folder based on the user-defined classification indicia (i.e., based on the nature of the sample documents associated by the user with the various folders) at block 54. To do this, the Naive Bayes classifier 36 (FIG. 2) is used to tally the frequency of each keyword appearing in the documents from that folder. Once the logic can make an effective preliminary determination of folder profiles, the logic moves to block 60.

At block 60, the logic accesses additional documents in the database 24 (FIG. 1) to add a few example documents to each folder in accordance with the preliminary profiles learned at block 54. These documents are presented to the user for consideration. Then, moving to decision diamond 62, the logic determines whether any user corrections are received, for example, the moving by the user of one or more of the example documents provided at block 60 to other folders. If so, the logic loops back to block 54 to modify the profiles of the folders in accordance with the user input at decision diamond 62. Otherwise, the logic ends at block 64 by moving the remaining documents into the appropriate folders in accordance with the profiles learned at block 54.

In presenting documents during reorganize by example, one of several policies can be used. Because the user has no idea how many examples should be provided to guarantee a sufficiently accurate classification, naively implementing reorganize by example by simply having the user pre-classify an unspecified number of documents from the source folder and training the classifier on these examples, and then routing the remaining documents automatically, is not desirable. Instead, to enable the classifier model to stabilize more quickly, one of the below-described policies is preferred.

In a random-balanced policy, the classifier is trained on the set of already classified instances in the target folders. In the random-balanced policy, the system automatically selects at random a document from those documents most likely belonging to the target folder having the fewest number of training documents, i.e., examples, to keep the number of user-classified examples from each class relatively equivalent, folder to folder.

Figure 4:
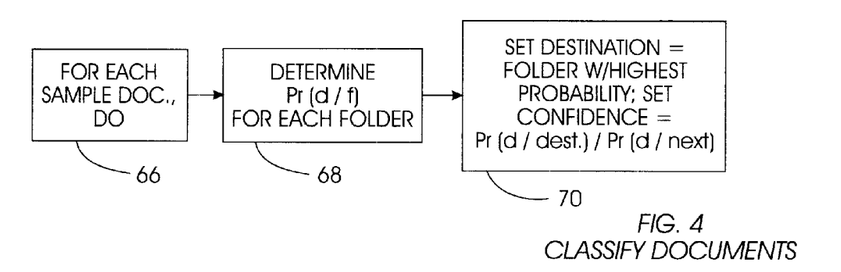
FIG. 4 is a flow chart of the logic used during the learn phase of the logic shown in FIG. 3.

FIG. 4 shows the logic used to learn folder profiles at block 54 in FIG. 3. Commencing at block 66, the logic enters a DO loop for each sample document provided by the user. Then, for each available folder, the logic determines the probability that the document fits the folder in accordance with Naive Bayes classification principles, it being understood that the initial profile for each folder is established by the documents assigned to that folder by the user at block 52 in FIG. 3.

More particularly, at block 68 the logic determines, for the document "d" under test, using the classification indicia "c" for each word "w" in the folder under test, the likelihood that the document "d" belongs in the class defined by the indicia "c" $\{L(d0c)\}$ in accordance with Naive-Bayes principles known in the art.

Having determined the likelihood that the document "d" belongs in the class defined by the indicia "c" $\{L(d0c)\}$, the logic next determines the probability that the document under test belongs in the classification indicia "c" $\{Pr(d0c)\}$ as follows:

$$Pr(d0c)=L(d0c)/\{\text{sum of all } L(d0c) \text{ for all documents in the database 24}\}$$

From block 68, the logic moves to block 70. At block 70, the logic defines a destination for the document under test to be the folder that is associated with the highest probability for that document as determined at block 68. Also, the logic defines a confidence for the document under test to be the ratio of the highest probability determined at block 68 to the next highest probability determined at block 68 for that document. In other words, the confidence for each document is the ratio of the highest folder probability for the document to a second-highest folder probability for the document. Thus, it can be appreciated that the confidence determined at block 70 is a measure of the confidence that the document is in the "correct" folder.

Figure 5:
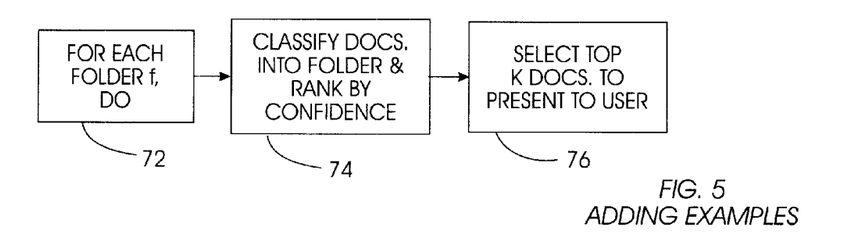
FIG. 5 is a flow chart of the logic used during the phase of adding examples in the logic shown in FIG. 3.

FIG. 5 shows additional details of the logic undertaken at block 60 in FIG. 3. Starting at block 72, the logic enters a DO loop for each folder. Moving to block 74, the logic classifies all documents in the database 24 into folders based on the folder profiles learned at block 54 in FIG. 3. These documents are then ranked by their respective confidences as determined at block 70 in FIG. 4, with the top "k" documents being returned to the user at block 76 as the example documents discussed above in relation to block 60 of FIG. 3.

Figure 6:
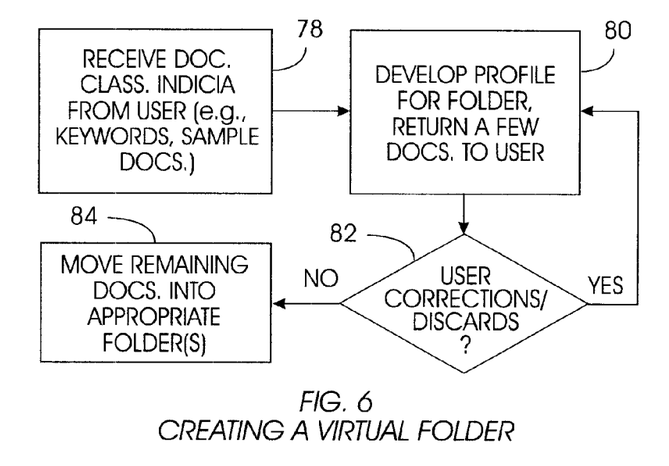
FIG. 6 is a flow chart of the logic for creating a virtual folder.

FIG. 6 shows how the present invention can be used to create a virtual document folder based on user-inputted classification indicia. Commencing at block 78, classification indicia are received from the user via one of the input devices 22, 23 shown in FIG. 1. This indicia can include keywords, sample documents, and rules. Moving to block 80, the logic develops a profile for a virtual folder, based on the classification indicia, in accordance with previously disclosed principles, and the logic then selects a few example documents and returns them to the user, based on the developed profile.

From block 80 the logic proceeds to decision diamond 82 to determine whether the user has made any corrections to the example set returned at block 80. These corrections can include adding more sample documents (i.e., adding more classification indicia) or discarding some of the example documents returned by the logic at block 80. Such discarded documents represent "negative" samples, or more broadly, negative classification indicia, and are used by the Naive Bayes classifier as follows: if a document matches the negative profile more than the virtual folder profile determined above, then the document is not moved to the virtual folder.

If it is determined at decision diamond 82 that the user has made corrections or discards to the example documents returned at block 80, the logic loops back to block 80 to iterate the profile development. Otherwise, the logic moves to block 84 to move any remaining documents that fit the profile of the virtual folder into the virtual folder.

Figure 7:
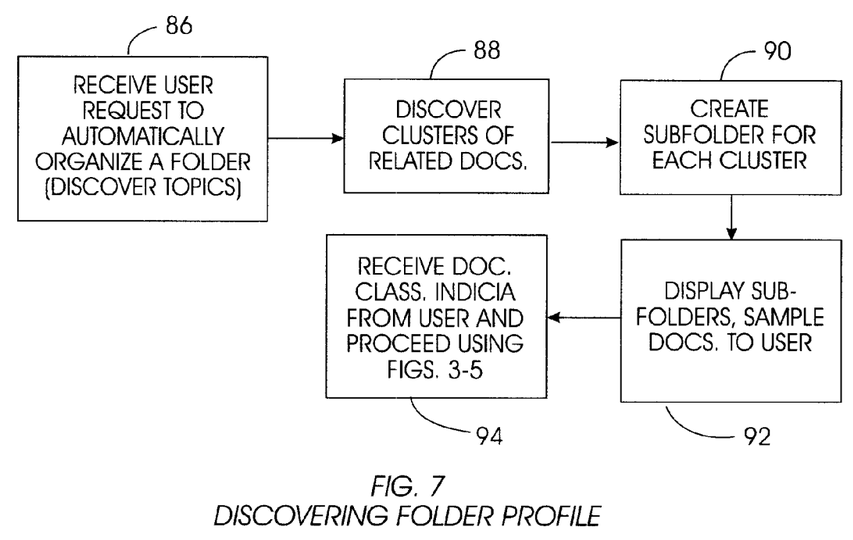
FIG. 7 is a flow chart of the logic for discovering a folder profile.

In addition to reorganizing folders as discussed in FIGS. 3–5 and creating a new folder as discussed in relation to FIG. 6, FIG. 7 shows that the profile of an existing folder or folders can be discovered using user-defined classification indicia, and folders then automatically reorganized. Commencing at block 86, a user request to automatically organize a folder or folders is received. Proceeding to block 88, the logic discovers clusters of similar documents in the folder as follows, in essence determining a profile for each subfolder.

Instead of using an agglomerative algorithm that is at best quadratic in time and space (and thus unsuitable for online applications such the present one), the below algorithm, set forth in pseudo code, is used:

Using a set D of input documents, a set P of previously-discovered or defined cluster digests (possible empty), and integer n (e.g., 6) specifying the number of clusters to evolve simultaneously, and an integer DIGEST_SIZE bounding the number of documents in a cluster, return a cluster digest consisting of at most DIGEST_SIZE documents from D as follows:

```
remove documents within the digests of P from D;
initialize a cluster C1 with a random document from D;
for i = 2, . . . , n DO:
    initialize a cluster Ci with the document d in D that minimizes the
    following: max(j=1 . . . I-1, sim(d, Cj))
for i=2, . . . , n DO
    let cluster Ci' contain the top min(|Ci|+1, DIGEST_SIZE), scoring
    documents according to: min(∀(Cp∈P), sim(d, Ci)–sim(d, Cp)) (if P
    empty, use sim(d, Ci))
if there exists some I=1, . . . , n such that Ci ≠ Ci', DO
    Ci←Ci' for all I=1, . . . , n
    return
return the cluster Ci out of C1, . . . , Cn that maximizes min(∀(d∈Ci),
sim(d, Ci))
``` wherein "sim" is a cosine distance function on term frequencies, with term frequencies damped by the square root function. For similarity comparisons between documents, the average pair-wise similarity between documents is computed.

The first three steps of the above algorithm undertakes initialization by removing documents from the input set that already belong to existing cluster digests, and seeding the n clusters with documents that are dissimilar to each other to spread the search for a good cluster digest across the document space. Step 4 grows the clusters until the maximum size is reached, maximizing similarity between documents in the cluster and maximizing dissimilarity between the cluster and other previously discovered clusters. The above algorithm facilitates the above-discussed user interactivity.

Moving to block 90, a subfolder is created for each cluster, and these subfolders, along with the "k" best example documents in them, are displayed to the user at block 92. Next, at block 94 the logic receives user-generated classification indicia in accordance with principles discussed above in relation to FIGS. 3–5 to modify the folder profiles generated at block 88. After the logic receives the user feedback, additional topics can be discovered by re-invoking the above pseudocode. The user continues adding clusters as desired.

Figure 8:
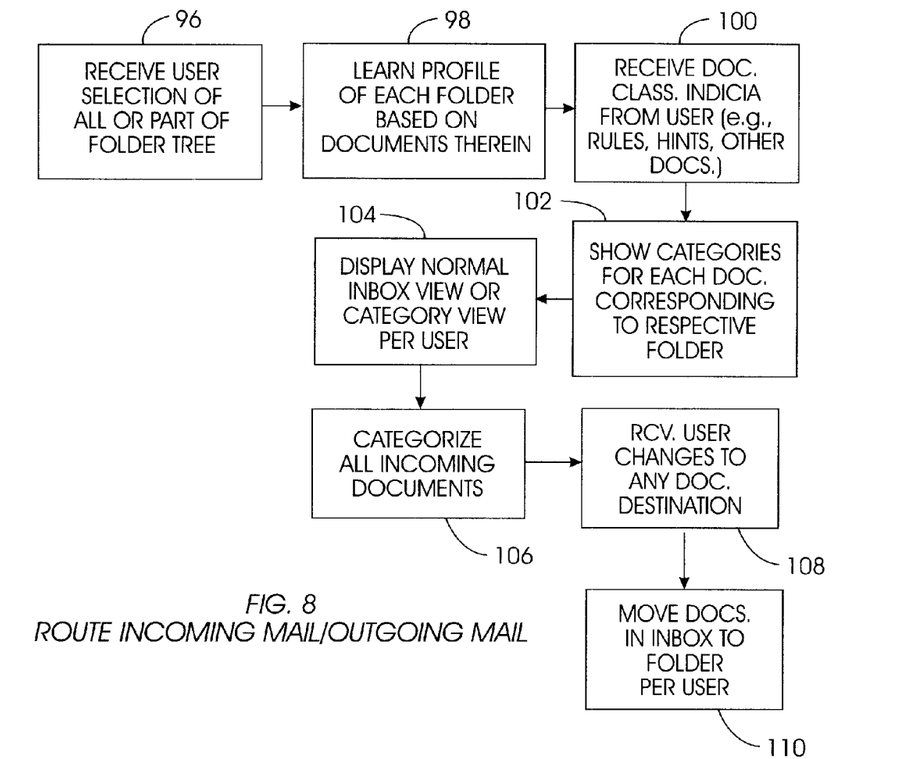
FIG. 8 is a flow chart of the logic for routing mail.

Now referring to FIG. 8, the logic of the present invention for routing incoming and outgoing documents, for example, email documents, can be seen. Starting at block 96 the user designates all or part of, e.g., the email document folder tree, and this designation is received by the present logic. Moving to block 98 the logic learns the profiles of each folder based on the documents contained in the folders, in accordance with previously disclosed principles. At block 100 document classification indicia is received from the user. As stated above, such indicia can include sample documents, rules.

From block 100 the logic proceeds to block 102 to modify, e.g., an email inbox view to display to the user incoming (or outgoing) email categories. Each of the categories corresponds to a folder received at block 96. Proceeding to block 104 the logic can switch between the normal inbox view and the category-based view as desired by the user.

Next, at block 106 all incoming emails are categorized (that is, placed in the appropriate folder) in accordance with the classification indicia received at block 100. If the user makes any changes to a document folder destination, these changes are received at block 108 and the folder profiles modified accordingly. At block 110, documents in the inbox categories are moved to the respective folders that correspond to the categories.

Figure 9:
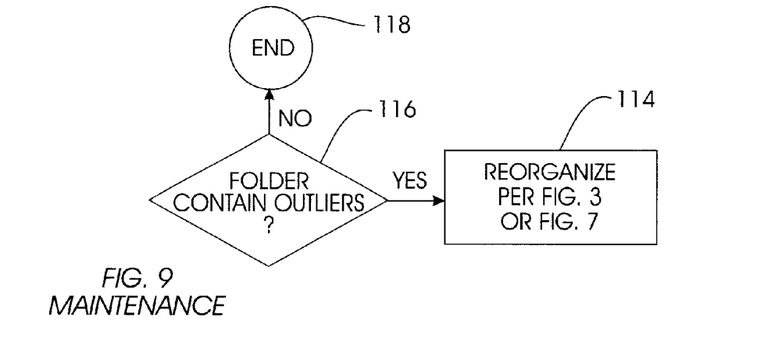
FIG. 9 is a flow chart of the logic for maintaining document folders.

Completing the present description in reference to FIG. 9, the above-disclosed principles can be applied to maintain folders, once they are establishes as set forth above. Commencing at decision diamond 116, whether a particular folder contains outlying documents, i.e., documents that are significantly different from the bulk of the documents in that folder. If so, the documents are rerouted to more appropriate folders at block 114 or presented to the user for rerouting; otherwise, the logic ends at state 118.

While the particular SYSTEM AND METHOD FOR ORGANIZING REPOSITORIES OF SEMI-STRUCTURED DOCUMENTS SUCH AS EMAIL as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A computer including at least one computer input device and at least one computer usable media having computer usable means for organizing one or more electronically-stored folders holding one or more documents, the computer usable means having:

means for receiving, from the input device, at least one signal representative of user-selected document classification indicia;

means for determining a profile of at least one folder based on the user-selected document classification indicia;

means for determining, for each document, respective folder probabilities, each folder probability representing the probability of the document fitting the profile of the respective folder;

means for defining a destination of a document to be the folder associated with the highest folder probability; and means for defining a confidence of a document properly being in a destination to be the ratio of the highest folder probability for the document to a second-highest folder probability for the document.

2. The computer of claim 1, wherein the user-selected document classification indicia includes at least one sample document representing a user-desired example of documents in a user-selected folder.

3. The computer of claim 2, further comprising:

means for receiving one or more folder establishing signals from the input device, the document classification indicia representing a user-desired profile of at least some folders; and means for automatically moving one or more documents into the folders, based on the means for determining a profile.

4. The computer of claim 1, wherein the user-selected document classification indicia includes at least one of: at least one classification rule.

5. The computer of claim 1, further comprising:

means for automatically moving one or more test documents into the folders, based on the means for determining a profile; and means for presenting at least a portion of at least some test documents, along with the associated folders, on a computer output device associated with the computer, such that a user can observe the test documents with folders and determine the efficacy of the means for determining a profile.

6. The computer of claim 5, wherein the means for receiving at least one signal representative of document classification indicia can receive additional user-defined document classification indicia generated in response to the means for presenting, the additional user-defined document classification indicia being usable by the means for determining a profile to refine the determinations of the profiles of the folders.

7. The computer of claim 1, further comprising means for requesting additional user-defined document classification indicia.

8. The computer of claim 1, further comprising means for generating a folder, based on the user-defined document classification indicia.

9. The computer of claim 1, further comprising means for grouping documents in at least one folder into sub-folders, based on the user-defined document classification indicia.

10. The computer of claim 1, wherein the documents are email documents, and the computer further comprises means for routing incoming email documents into one or more folders, based on the user-defined document classification indicia.

11. A computer-implemented method for organizing email documents in a database into one or more folders, comprising:
receiving one or more sample email documents from the user, the sample documents being a relatively small subset of the documents in the database; and
based on the sample documents, automatically associating substantially all of the documents in the database with one or more folders, the associating act including:
determining, for each document, respective folder probabilities, each folder probability representing the probability of the document fitting the profile of the respective folder;
defining a destination of a document to be the folder associated with the highest folder probability; and
defining a confidence of a document properly being in a destination to be the ratio of the highest folder probability for the document to a second-highest folder probability for the document.

12. The method of claim 11, wherein the sample documents establish user-defined classification indicia, and the associating step includes determining a profile of at least one folder based on the user-selected document classification indicia.

13. The method of claim 12, wherein the user-selected document classification indicia includes at least one of: at least one classification rule.

14. The method of claim 12, further comprising:
receiving one or more folder establishing signals from a computer input device, the document classification indicia representing a user-desired profile of at least some folders.

15. The method of claim 12, further comprising:
automatically moving one or more test documents into the folders, based on the determining step; and
presenting at least a portion of at least some test documents, along with the associated folders, on a computer output device, such that a user can observe the test documents with folders and determine the efficacy of the step of determining a profile.

16. The method of claim 15, further comprising:
receiving additional user-defined document classification indicia generated in response to the presenting step, the additional user-defined document classification indicia being usable for refining the determinations of the profiles of the folders.

17. The method of claim 12, further comprising requesting additional user-defined document classification indicia.

18. The method of claim 12, further comprising generating a folder, based on the user-defined document classification indicia.

19. The method of claim 12, further comprising grouping documents in at least one folder into sub-folders, based on the user-defined document classification indicia.

20. The method of claim 12, further comprising routing incoming email documents into one or more folders, based on the user-defined document classification indicia.

21. A computer program device comprising:
a computer program storage device readable by a digital processing apparatus; and
a program means on the program storage device and including instructions executable by the digital processing apparatus for performing method steps for organizing semi-structured documents into folders, the method steps comprising:
receiving, from a computer input device, at least one user-generated sample signal representing one or more sample documents;
based thereon, establishing a profile for at least two document folders, the establishing act including:
determining, for each document, respective folder probabilities, each folder probability representing the probability of the document fitting the profile of the respective folder;
defining a destination of a document to be the folder associated with the highest folder probability; and
defining a confidence of a document properly being in a destination to be the ratio of the highest folder probability for the document to a second-highest folder probability for the document; and
based on the profile, moving documents from a database into the folders.

22. The computer program device of claim 21, wherein the documents are emails.

23. The computer program device of claim 21, wherein the method steps further comprise receiving one or more folder establishing signals from the computer input device.

24. The computer program device of claim 21, wherein the method steps further comprise:
in response to the establishing step, presenting at least a portion of at least some test documents, along with the associated folders, on a computer output device, such that a user can observe the test documents with folders.

25. The computer program device of claim 24, wherein the method steps further comprise:
receiving additional user-defined document classification indicia generated in response to the presenting step, the additional user-defined document classification indicia being usable for refining the determinations of the profiles of the folders.

26. The computer program device of claim 21, wherein the method steps further comprise requesting additional sample signals from the user.

27. The computer program device of claim 21, wherein the method steps further comprise generating a folder, based on the sample signal.

28. The computer program device of claim 21, wherein the method steps further comprise grouping documents in at least one folder into sub-folders, based on the sample signal.

29. The computer program device of claim 21, wherein the method steps further comprise routing incoming documents into one or more folders, based on the sample signal.

* * * * *